United States Patent [19]

Namatame et al.

[11] Patent Number: 5,552,595
[45] Date of Patent: Sep. 3, 1996

[54] NARROW BAND HIGH SENSITIVITY PHOTODETECTOR FOR INVERSE PHOTOEMISSION SPECTROSCOPY

[75] Inventors: Hirofumi Namatame, Higashihiroshima; Masaki Taniguchi, Hiroshima, both of Japan

[73] Assignee: Hiroshima University, Hiroshima, Japan

[21] Appl. No.: 404,553

[22] Filed: Mar. 15, 1995

[30] Foreign Application Priority Data

Mar. 24, 1994 [JP] Japan .................... 6-053822

[51] Int. Cl.$^6$ .................... G01N 21/00; G02F 1/01; H01L 31/10
[52] U.S. Cl. .................... 250/207; 250/372; 250/458.1; 250/459.1
[58] Field of Search .................... 250/207, 214 VT, 250/214 R, 214.1, 310, 307, 306, 372, 458.1, 459.1; 313/93, 528, 532, 533, 539

[56] References Cited

U.S. PATENT DOCUMENTS 3,712,700  1/1973  Sommer .................... 445/13
5,120,965  6/1992  Suga et al. .................... 250/372
5,340,976  8/1994  Taniguchi et al. .................... 250/207

FOREIGN PATENT DOCUMENTS

0190079  8/1986  European Pat. Off. .
0562874  9/1993  European Pat. Off. .

Primary Examiner—Edward P. Westin
Assistant Examiner—John R. Lee
Attorney, Agent, or Firm—Spencer & Frank

[57] ABSTRACT

A narrow band high sensitivity photo-detector for inverse photoemission spectroscopy, in which an electron beam from an electron gun is applied onto a sample and a light reflected therefrom is converged into a photo-electron detector, so as to effect photo-electron detection in a photo-electron multiplier, wherein said photo-electron detector comprises a $CaF_2$ monocrystal window provided with a KCl thin film in the front of said photo-electron detector, a first dynode deposited with a KCl thin film on a surface thereof, wherein an output of the photo-electron multiplier is applied with a pulse counter circuit through an amplifier, so as to measure light absorption properties, window transmissibility and detection sensitivity as a band pass filter.

3 Claims, 6 Drawing Sheets

FIG_4A

FIG_4B

FIG_4C

FIG_5

FIG_6

FIG_7

NARROW BAND HIGH SENSITIVITY PHOTODETECTOR FOR INVERSE PHOTOEMISSION SPECTROSCOPY

BACKGROUND OF THE INVENTION

1. Field of the Invention

The present invention relates to a narrow band high sensitivity photo-detector, which belongs to the technical fields of electron technology and photon technology and is used for a high resolution inverse photoemission spectroscope.

2. Related Art Statement

Figure 1:
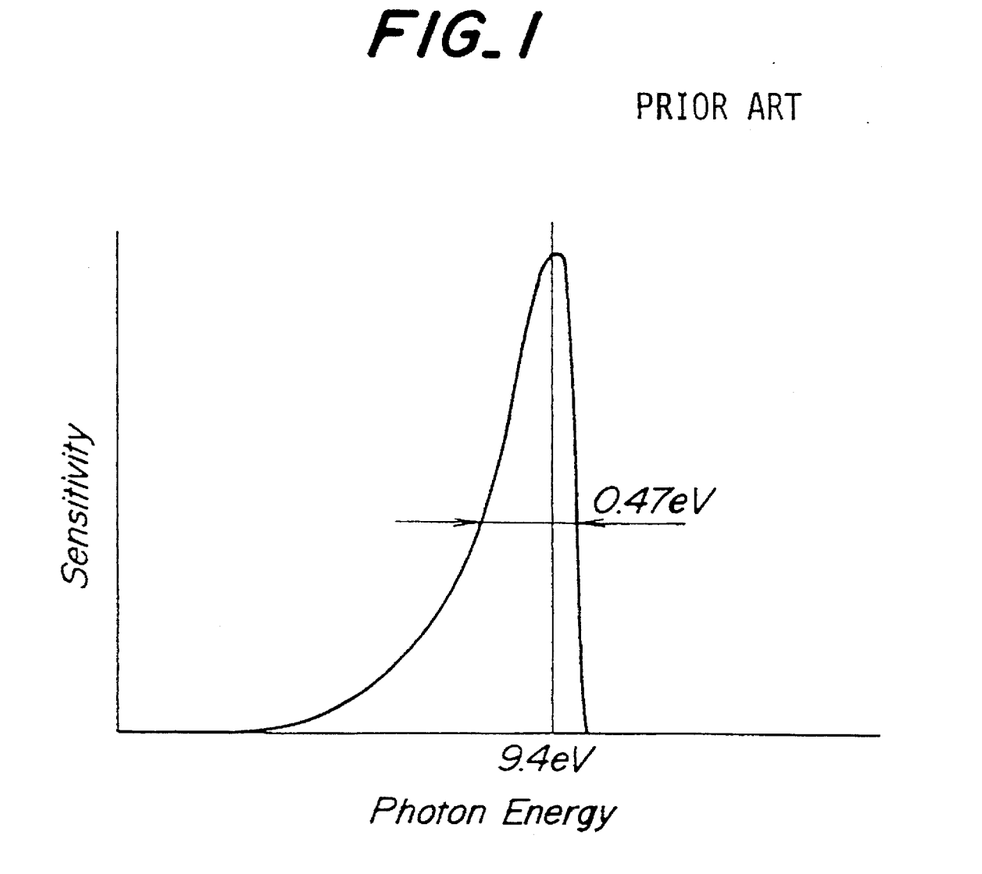
FIG. 1 is a diagram showing a property of a conventional band pass filter type photo-detector for inverse photoemission spectroscopy.

A band pass filter type photo-detector for inverse photoemission spectroscopy is formed of a simple combination of low-cut and high-cut filters. In a recently developed photo-detector having excellent properties, the low-cut filter is a photo-electron multiplier provided with Cu-BeO having a KCl thin film deposited on a surface thereof for the first dynode, while the high-cut filter is a $SrF_2$ monocrystal window having a sensitivity property of central energy at 9.40 eV and a half value width of 0.47 eV, as shown in FIG. 1.

This band pass filter type photo-detector is characterized by a structure that is simple and an operational stability that is high. However, the obtainable resolution thereof is no more than 0.47 eV at most.

Photoemission spectroscopy and inverse photoemission spectroscopy are means for directly observing occupied and unoccupied electronic states of energy in a material, respectively, and hence have a complementary relation with each other. The presently standardized resolution of photoemission spectroscopy is on the order of 0.3 eV. The investigation of occupied and unoccupied electronic states of energy with a precision of the same order by the employment of photoemission and inverse photoemission spectroscopies respectively is extremely desirable for the research of materials. It is necessary for the realization thereof to narrow the bandwidth of the band pass filter type photo-detector into the order of 0.3 eV.

In general, when an attempt is made to obtain higher resolution, the detection sensitivity is lowered in correspondence therewith. This is also true of the band pass filter type photo-detector. If the surface of the material to be measured is unstable in vacuum, an experiment wherein signals are accumulated for a long time is impractical. In this case, it is required to raise the detection sensitivity at the sacrifice of resolution. However, it is not possible to vary the width of the passband of the conventional band pass filter type photo-detector during the experiment. Accordingly, it is required for achieving high resolution to provide a measuring apparatus comprising two kinds of detectors, a high resolution detector, even if the detection sensitivity is somewhat low, and a high sensitivity detector.

Photoemission spectroscopy and inverse photoemission spectroscopy present information relating to occupied and unoccupied electronic states respectively, so that the whole aspect of the electronic states of a material cannot be clarified until both kinds of information are combined. The resolution of conventional photoemission spectroscopy is on the order of about 0.3 eV, while the resolution of conventional inverse photoemission spectroscopy is on the order of about 0.5 eV. Accordingly, it is necessary for comparing and investigating respective data from both of these spectroscopies to provide comparable resolutions thereto. Inverse photoemission spectroscopy is a method for clarifying the unoccupied electronic state of a material by applying a monochromatized electron to a sample, taking notice of a certain single energy component of light emitted from the surface of the sample, and by observing the intensity of the emitted light as a function of the energy of the noticed electron beam. The energy width of the electron beam is defined by the expansion of a thermo-electron in the electron source, which is about 0.25 eV. On the other hand, the width of the pass band of the band pass filter type photo-detector is conventionally about 0.47 eV and has been improved to 0.35 eV by recent technical development. However, to obtain resolution comparable with that of photoemission spectroscopy, it is necessary to narrow the width of the passband of the photo-detector to the order of the electron beam width of 0.25 eV.

In general, when the resolution is raised, the detection sensitivity is lowered. This is also true of the band pass filter type photo-detector for inverse photoemission spectroscopy, so that, when the width of the detector is narrowed to half value, the detection sensitivity is lowered and hence a longer time is required for the measurement. On the other hand, when the width of the detector is widened to half value, the sensitivity is raised, and thereby the measurement is carried out in a shorter time. In general, whether either the resolution or the sensitivity is preferential is decided by the limitation of the time required for the measurement and whether the material to be measured is stable or not in super high vacuum wherein the inverse photoemission spectroscopy is effected.

The resolution of inverse photoemission spectroscope is primarily defined by the bandwidth of the band pass filter type of photo-detector.

Two types of conventional photo-detectors are used in practice, that is, the photo-electron multiplier type and the Geiger-Mueller tube type. With respect to stability and affinity to super-high vacuum, a photo-detector of the photo-electron multiplier type is irresistively advantageous, and hence is adopted by most of the research groups in the world. The photo-detector according to the present invention also belongs to this type. However, the conventional photo-detector is inferior with respect to resolution in spite of its superiority in stability and super-high vacuum performance. The bandwidth of a recently used photo-detector of this type is a minimum of about 0.47 eV.

SUMMARY OF THE INVENTION

An object of the present invention is to provide a narrow band and high sensitivity photo-detector for inverse photoemission spectroscopy in which, the bandwidth is improved into the order of about 0.35 eV by a very simple method, so as to attain the desired improvement of about one and half times, although the sensitivity would be essentially lowered in the prior art by narrowing the bandwidth.

Thus, the central energy of the band pass filter is shifted toward the higher side by about 0.5 eV from the conventional value, and hence electrons having an energy higher than the conventional value are available. Consequently, the present invention contributes to the improved performance of the whole arrangement including the electron gun.

An object of the present invention is to provide a photo-detector having high sensitivity, as well as an improved half value width compared to the conventional value of 0.47 eV to about 0.3 eV for inverse photo-emission spectroscopy. The improvement of the resolution and the sensitivity of the band pass filter type photo-detector facilitates high resolution inverse photo-emission spectroscopy and contributes to the evaluation of all kinds of material to a significant extent.

An object of the present invention is to provide a technique for realizing higher resolution than that achievable with conventional photoemission spectroscopy as well as higher detection sensitivity, so that it is required to prove an effective power for a practical high resolution experiment.

According to the present invention, it is possible to realize a higher resolution than that obtained with prior techniques by slightly improving the conventional photo-detector, as well as an improvement by 1.6 times of the detection sensitivity, so that it is possible to greatly reduce the time required for the experiment at higher resolution as compared with prior techniques, and hence to make great contribution to research into the properties of materials.

An object of the invention is to provide a narrow band high sensitivity photo-detector for inverse photoemission spectroscopy in which an electron beam from an electron gun is applied onto a sample and light reflected therefrom converged into a photo-detector, so as to effect photo-detection, wherein said photo-detector comprises a $CaF_2$ monocrystal window deposited with a KCl thin film and provided in the front of a photo-electron multiplier in the photo-detector, and a photo-electron multiplier comprising a KCl thin film deposited on a surface of a first dynode of said photo-electron multiplier, wherein an output of the photo-electron multiplier is connected with a pulse counter circuit through an amplifier, so as to measure light absorption properties including the window transmissibility and the detection sensitivity.

BRIEF DESCRIPTION OF THE DRAWINGS

For better understanding of the invention, reference is made to the accompanying drawings, in which:

FIG. 4 (A), 4(B) and 4(C) are diagrams showing energy dependency of detection sensitivities and transmissibility of the window comprising the photo-detector according to the present invention, respectively;

Throughout different views of the drawings; 1 is an electron gun, 2 is an electron beam, 3 is a sample, 4 is a reflected light, 5 is a converging mirror, 6 is a photo-detector, 7 is a photo-electron multiplier, 8 is a $CaF_2$ monocrystal window deposited with a KCl thin film, 9 and 10 are KCl thin films, 11 is a first dynode, 12 is an amplifier, 13 is a pulse counter circuit, 14 is a photo-electron, 15 is an electrode and 16 is a collector.

DESCRIPTION OF THE PREFERRED EMBODIMENT

Figure 2:
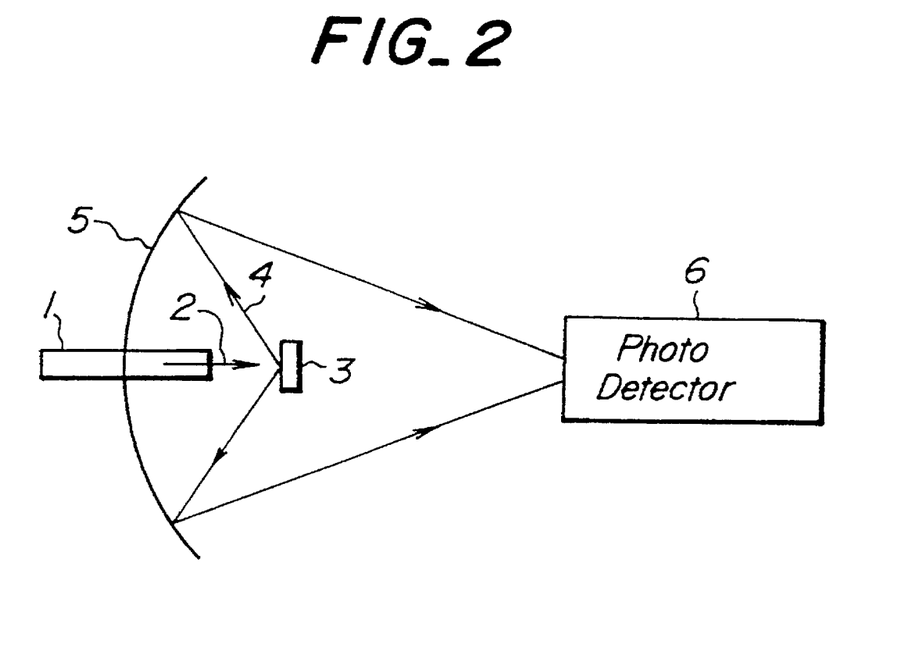
FIG. 2 is a schematic diagram showing the principle of a band high sensitivity photo-detector for inverse photoemission spectroscopy according to the present invention.

FIG. 2 is a schematic diagram for explaining the objection of inverse photoemission spectroscopy, in which 1 is an electron gun, 2 is an electron beam emitted therefrom, and 3 is a sample. The electron beam 2 emitted from the electron gun impinges on the sample. Light 4 emitted from the sample 3 is converged by a converging mirror 5 and projected to a photo-detector 6.

Figure 3:
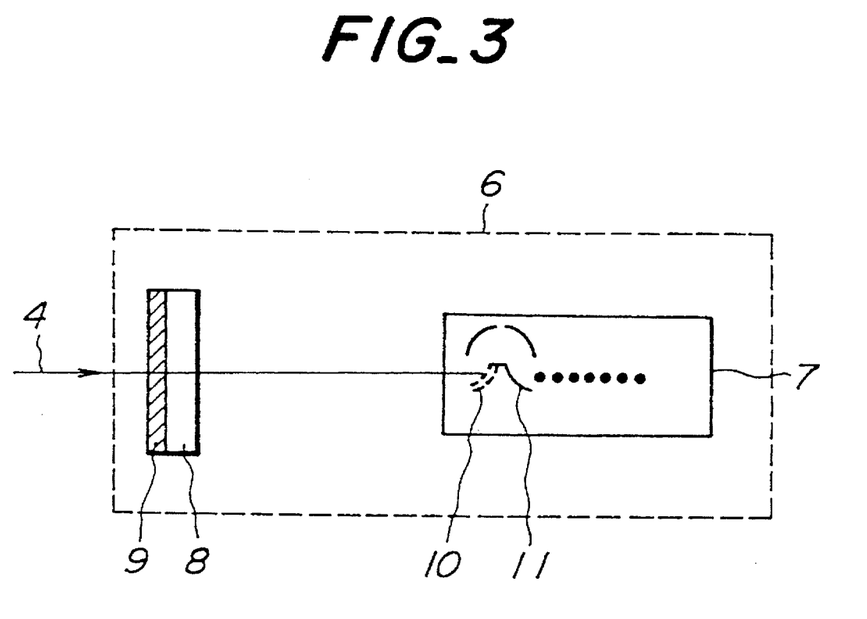
FIG. 3 is a diagram showing a principal arrangement of an example of the photo-detector comprising a photo-electron multiplier according to the present invention.

FIG. 3 shows the arrangement of the inverse photoemission multiplier 7 provided in a photo-detector 6 as shown in FIG. 2, wherein a $CaF_2$ monocrystal window 8 has a KCl thin film 9 of 150 Å in thickness deposited on the surface thereof.

The light 4 as shown in FIG. 3 is the same as the incident light of the photo-detector as shown in FIG. 2. Thus, the light passing through the KCl thin film 9 and the $CaF_2$ monocrystal window 8 impinges on the first dynode 11 of a photo-electron multiplier 7 of the solar blind type (e.g. HTV: R-595), wherein a KCl thin film 10 is deposited with a thickness of 1000 Å on the surface of said first dynode.

Figure 4A:
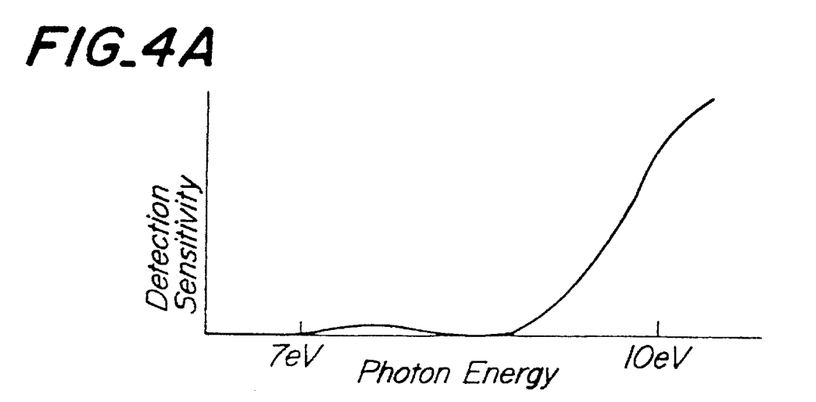
Figure 4B:
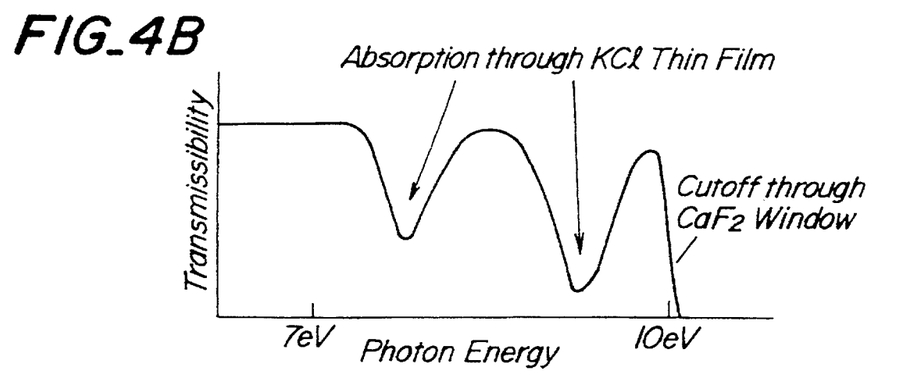
Figure 4C:
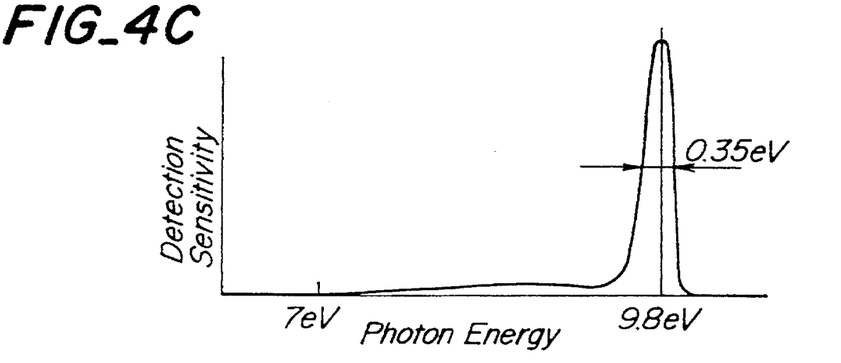

The incident light 4 of the photo-detector 6 as shown in FIG. 2 passes through the $CaF_2$ monocrystal window 8 deposited with the KCl thin film 9 as shown in FIG. 3. The cutoff energy of the $CaF_2$ monocrystal window 8 is 10 eV at room temperature, so that any light having an energy higher than about 10 eV cannot pass therethrough to the first dynode as shown in FIG. 4(B). FIGS. 4(A), 4(B) and 4(C) show the detection sensitivity of the dynode 11 with KCl deposited thereon, transmissibility and detection sensitivity at a central energy of 9.8 eV of the $CaF_2$ monocrystal window, respectively.

Consequently, the principal constituents according to the present invention are the following:

(a) The solar blind type photo-electron multiplier 7.

(b) The first dynode 11 having a KCl thin film 10 of 1000 Å thickness deposited on the surface thereof.

(c) The $CaF_2$ monocrystal window 8 having the KCl thin film 9 of 150 Å in thickness deposited on the surface thereof.

The combination of the constituent (a), that is, the photo-electron multiplier 7, the constituent (b), that is, the first dynode 11 and the constituent (c), that is, the KCl thin film 9 deposited on the surface of the monocrystal window 8 acts as a low cut filter, while the $CaF_2$ monocrystal window 8 including the KCl thin film 9 in the constituent (c) partially acts as a high cut filter, as is apparent from FIGS. 4(A), 4(B) and 4(C). It is possible according to the combination of the constituents (a), (b) and (c) to realize a band pass filter type photo-detector having a central energy of 9.8 eV and 0.35 eV half width value as shown in FIG. 4(C), as well as a sensitivity increased by about 1.6 times in comparison with that employing a conventional $SrF_2$ window.

The present invention is conceived on the basis of the following facts:

(1) The bank pass property of a conventional photo-detector is attained by the combination of a low pass filter comprising a $SrF_2$ monocrystal window and a high pass filter based on the rise-up property of the photo-electron multiplier.

(2) The deterioration of the resolution is caused by the gradual cutoff property of the highpass filter.

(3) The property of the highpass filter is defined by the sensitivity performance of the photo-electron multiplier, so that the bandwidth can be reduced by the improvement thereof.

(4) Thus, in the present invention by employing a photo-electron multiplier having the first dynode deposited with a KCl thin film, the rise-up of the sensitivity performance is sharpened, the efficiency of photoemission is improved, and the sensitivity is increased.

(5) Moreover, it is required for narrowing the bandwidth to improve the cutoff property of the highpass filter, that is, the sensitivity property of the photo-electron multiplier.

(6) Although it is therefore required to introduce a thin film having a sharp absorption property in the vicinity of cutoff, the sensitivity is lowered as a whole, because of finite absorption caused by the thin film proper.

(7) It is required in the introduction of the absorbing thin film to realize the high sensitivity. It is enough for this requirement that the photo-electron multiplier is operated in the high sensitivity region, that is, in a higher energy region than that of the prior art.

(8) According to the present invention, the cutoff energy of the lowpass filter is shifted toward the higher side by 0.5 eV by replacing the conventional $SrF_2$ window with a $CaF_2$ window.

(9) A thin film having the sharp absorption corresponding to the cutoff of $CaF_2$ is introduced. The KCl thin film is the most suitable for this introduction.

(10) According to the combination of the KCl thin film, the $CaF_2$ window and the photo-electron multiplier deposited with KCl of a 1000 Å thickness in front of the dynode, the bandwidth is narrowed from 0.47 eV to 0.35 eV and the sensitivity is increased by about 1.6 times in comparison with the prior art.

It is usual in the inverse photoemission spectroscope that, in the super high vacuum of an order of $10^{-10}$ Torr, as shown in FIG. 2, the low speed electron beam 2 is projected and radiated on the sample 3, the light 4 emitted therefrom is directed to the photo-detector 6 through a large solid angle collecting mirror 5. The photo-detector according to the present invention is arranged in such a manner that the collected light 4 within the range of 9.8±0.12 eV only can be detected.

In the photo-detector according to the present invention, the sensitivity is improved as well as the low cutoff filter property is improved by depositing the KCl thin film 10 on the dynode 11 consisting of Cu-BeO. As a result, the conventional resolution of, 0.47 eV can be maintained by the combination with the high-cut filter formed of the conventional $SrF_2$ window.

As to the photo-detector, $CaF_2$ having a high cut-off energy of 10 eV is preferable to the conventional $SrF_2$ having a cutoff energy of 9.5 eV. However, the bandwidth is widened and the resolution is lowered by shifting the cutoff energy of the high-cut filter toward the high energy side.

Then, according to the present invention, the KCl thin film 9 is deposited on the $CaF_2$ monocrystal window 8, so as to shift the cutoff energy of the low-cut filter toward the high energy side under the utilization of the light-absorption property, as well as to improve the cutoff property.

According to the present invention, by combining the high cutoff filter comprising the $CaF_2$ monocrystal window 8 and the low cutoff filter employing the KCl light absorbing thin film 10, the bandwidth can be improved to 0.35 eV and further the detection sensitivity is successfully raised by about 1.6 times comparing with the prior art.

The low-cut property is conventionally defined only by the sensitivity property of the first dynode, which is usually coated with material for improving the sensitivity, while, according to the present invention, it is improved by introducing a new cutoff element as the novel feature and as the essential constituent. Thus, according to the present invention, the $CaF_2$ monocrystal window 8 is introduced and further the KCl thin film 9 is employed, through which the most suitable low-cut property for the high-cut property of the introduced $CaF_2$ window 8 can be realized. The KCl thin film 9 is provided by directly depositing it on the surface of the $CaF_2$ monocrystal window 8 as used for the high-cut filter. An RbF thin film which has similar light-absorption property is available also for the photo-detector of the present invention in place of the KCl thin film.

According to the narrow band high sensitivity photo-detector of the present invention, an industrially remarkable effect can be obtained such that the following properties can be detected with a narrow band and high sensitivity:

(1) The photo-detecting property of the photo-electron multiplier is improved by depositing a KCl thin film onto the first dynode of the photo-electron multiplier.

(2) The light transmission property of the $CaF_2$ monocrystal window is improved by depositing a KCl thin film thereon.

(3) The sensitivity property of the photo-detector is improved by the combination of (1) and (2).

EXAMPLE

Figure 5:
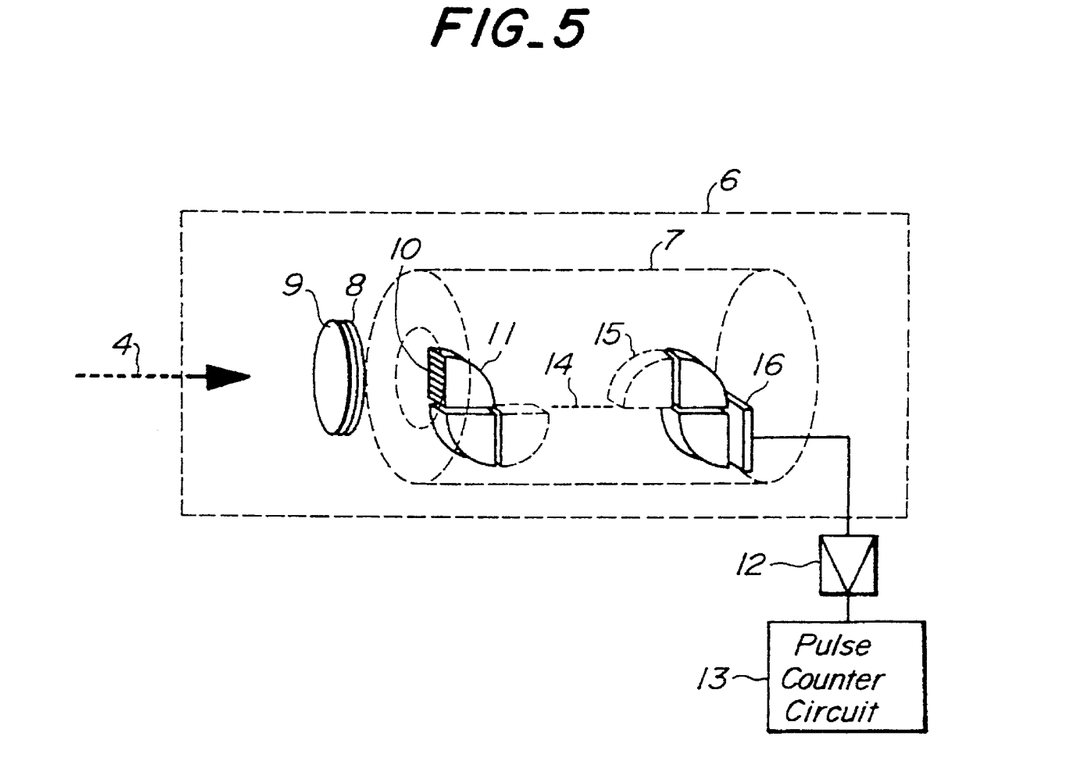
FIG. 5 is a diagram showing an actual arrangement of the photo-detector according to the present invention.

A concrete example of the narrow band high sensitivity photo-detector for inverse photoemission spectroscopy according to the present invention will be described hereinafter in detail by reference to the attached drawings. FIG. 5 shows an example of the actual arrangement of the photo-detector 6 as shown in FIG. 2.

In FIG. 5, 4 is the incident light, 8 is the $CaF_2$ monocrystal window deposited with a KCl thin film 9 of 1000 Å in thickness, 7 is a photo-electron multiplier, 11 is a first dynode deposited with a KCl thin film of 1000 Å thickness, 12 is an amplifier connected with an output of the multiplier 7, 13 is a pulse counter circuit, 14 is a photo-electron, 15 is an electrode and 16 is a collector.

The light transmission property of the $CaF_2$ monocrystal window 8 exhibits the light transmission property of a lowpass filter, such that the absorption coefficient of an exciton is abruptly increased in the vicinity of 10 eV as shown in FIG. 4(B) wherein the light cannot be transmitted in the region over this cutoff energy, that is, about 10 eV. On the other hand, the $CaF_2$ monocrystal window 8 is transparent for light in the region below this cutoff energy, whereby the transmission property thereof is substantially flat.

Figure 6:
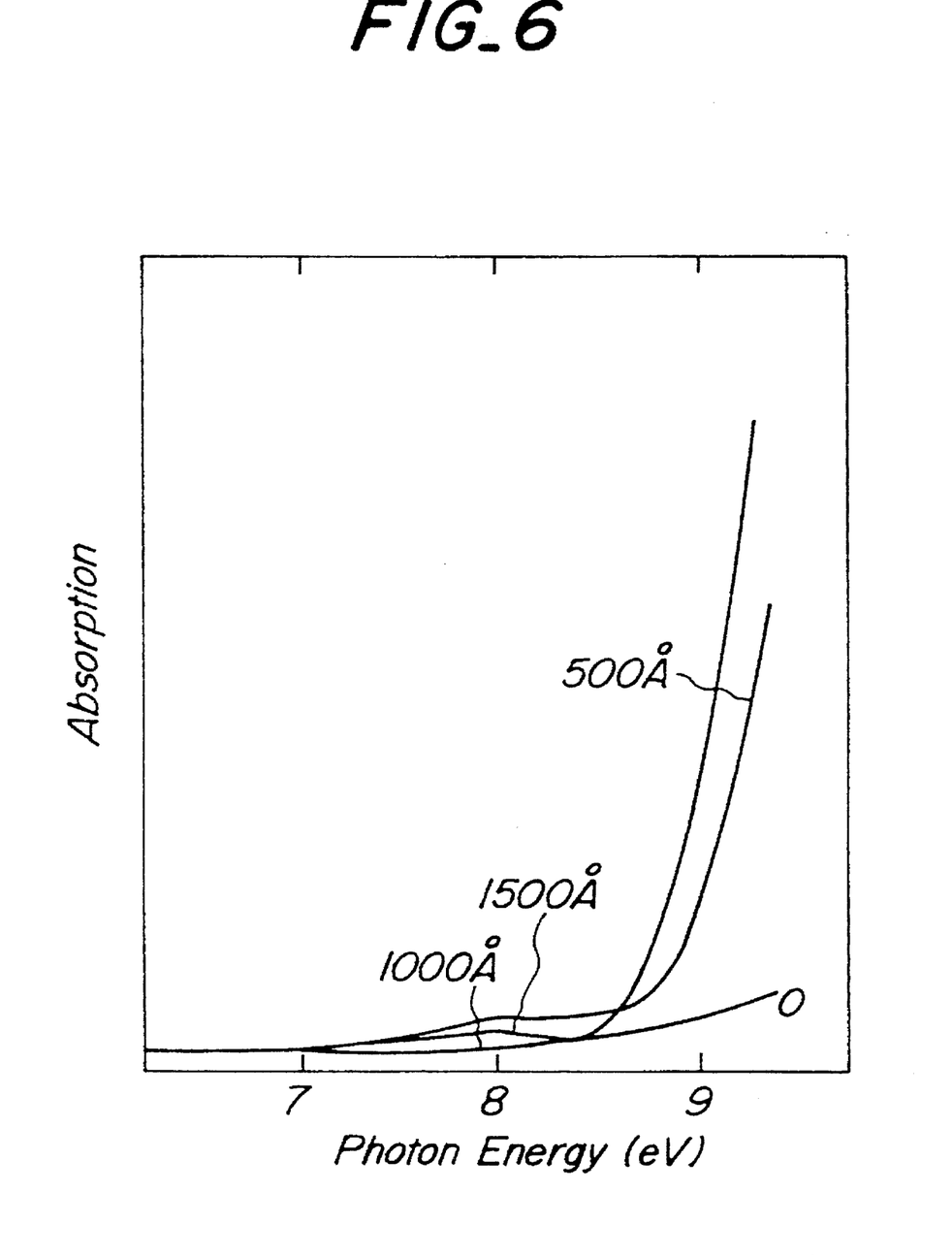
FIG. 6 is a diagram showing the photoemission absorption properties of photo-detectors comprising KCl thin films deposited in thicknesses of 500 Å, 1000 Å and 1500 Å respectively.

Next, the photo-detection property of the photo-electron multiplier 7 having the first dynode 11 deposited with a KCl thin film 10 1000 Å thick will be described. The first dynode 11 is formed of CuBe-O and the photoemission absorption thereof shows a definite value in the vicinity of 6 eV and further is increased together with an increase of the photo-electron energy. Thus, when the KCl thin film 10 is deposited on the surface of the first dynode 11, the photoemission absorption property is varied such that it is abruptly increased in the vicinity of a photo-energy of 9 eV. This is because of the reflection of the photoemission absorption property of the KCl thin film 10, as shown in FIG. 6. The KCl thin film 10 is an ion crystal, that is, an insulator proper. Accordingly, it is charged by deriving the photoemission therefrom, so that the deposition of a too thick KCl film reduces the absorption, while the deposition of a too thin KCl film reduces the contribution to the absorption thereof and hence the absorption decreases. Consequently, it is necessary to appropriately select the most suitable thickness of the KCl thin film to be deposited.

When the photo-electron absorption is measured as the thickness of a KCl thin film, it appears that this absorption is almost simply increased until the vicinity of 1000 Å thickness as shown in FIG. 6, and present the tendency of saturation with a further increase of thickness. According to a further detailed observation of film thickness dependency of the photo-electron absorption, it appears that the absorption at the vicinity of 8 eV is reduced at the vicinity of 1000 Å thickness. Thus, it is possible to realize such a property that the photo-electron absorption is reduced at the vicinity of 8 eV and is suddenly increased over 9 eV by depositing a KCl thin film of 1000 Å thickness. Even if the thickness of the KCl thin film 10 is less than 500 Å, the absorption is suddenly increased below 9 eV, so that the too thin KCl film 10 produces an unfavorable result.

The photo-electron 14 from the first dynode 11 is amplified by the order of $10^6$ through plural stages of electrodes 15 for secondary electron multiplication, collected by the collector 16 and the intensity thereof is observed by the pulse counter circuit 13 after preamplification through the amplifier 12. The photo-electron multiplier 7 has the property of a highpass filter as to the photo-energy, so that the cutoff energy thereof is defined by the rise-up of photoemission absorption of the KCl thin film, and hence is positioned at the vicinity of 9 eV as shown in FIG. 6.

Thus, a band pass filter can be realized by combining the $CaF_2$ monocrystal window 8 deposited with the KCl thin film 9 and the first dynode 11 of the photo-electron multiplier 7 deposited with the KCl thin film 10, that is, the lowpass filter and the highpass filter respectively, the difference between respective cutoff energies becoming the bandwidth thereof. However, the property obtained in practice does not present an ideal step function like a filter property, but represents a gradual variation at the vicinity of cutoff, so that the band pass property obtained in practice shows an unsymmetrical peak structure based on the reflections of both of the respective rise-up properties.

The cutoff property of the lowpass filter is sharp in a good $CaF_2$ monocrystal window because of the employment of the exciton absorption, while the cutoff property of the highpass filter is comparatively gradual because of the photoemission absorption property reflecting the inter-band transition of the KCl thin film. Consequently, to narrow the half value width of the pass band, it is necessary to improve the highpass filter property.

Figure 7:
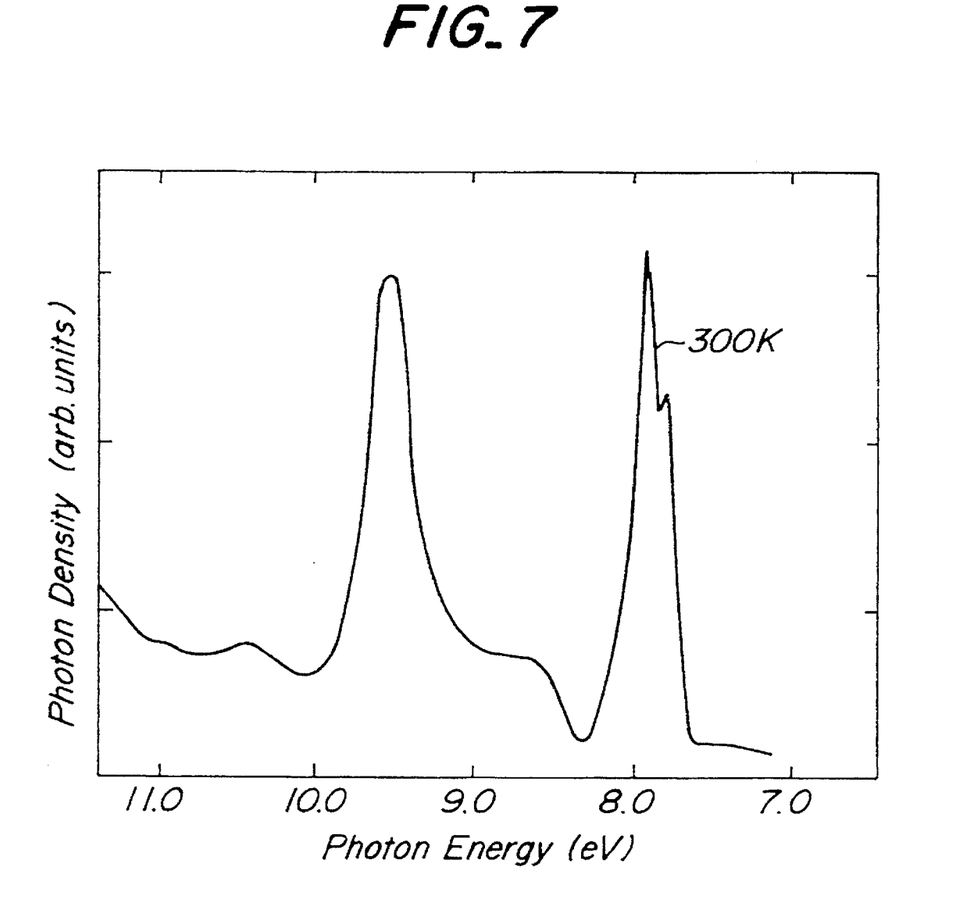
FIG. 7 is a diagram illustrating a property of a band pass filter showing an unsymmetrical peak structure according to the present invention, wherein a $CaF_2$ monocrystal window is combined with a KCl thin film deposited on a front surface of a photo-electron multiplier.

The transmission property (photon density) of a KCl thin film represents sharp absorption at the vicinity of 9.5 eV, the energy level of which is somewhat lower than the cutoff of the lowpass filter and corresponds to the cutoff of the highpass filter as shown in FIG. 7. A highpass filter having a cutoff property improved by the aforesaid combination of the KCl thin film 10 as the KCl thin film of first dynode 11 of the photo-electron multiplier 7 can be realized.

In the narrow band high sensitivity photo-detector for inverse photoemission spectroscopy according to the present invention, the $CaF_2$ monocrystal window is employed as the high-cut filter, while the photo-electron multiplier having high sensitivity in the region exceeding ultraviolet energy in vacuum is employed as the low-cut filter. In addition to the fundamental arrangement according to the present invention, for improving the performance, the low energy side property of the band pass filter is improved through the absorption property of the KCl thin film 9 which is deposited on the $CaF_2$ monocrystal window 8 in the phototransmission region, as well as the KCl thin film 10 deposited on the photoemission surface of the first dynode 11 of the photo-electron multiplier 7 for the improvement of sensitivity. The present invention is featured in that the bandwidth is narrowed and the sensitivity is improved by taking notice of the temperature dependency of the light absorption property of the $CaF_2$ monocrystal window 8, the KCl thin film 9 deposited thereon and the KCl thin film 10 deposited on the first dynode 11.

A narrow band high sensitivity photo-detector for inverse photoemission spectroscopy according to the present invention is operated in a higher sensitivity region than that of the conventional photo-electron multiplier, which is provided by replacing the $SrF_2$ monocrystal window in the prior art, which is used as the high-cut filter in the conventional photo-detector, by providing the $CaF_2$ monocrystal window with a KCl thin film 9, while the property of the low-cut filter is improved by introducing the KCl thin film 10 having a sharp absorption property in the vicinity of the cutoff energy of the $CaF_2$ monocrystal window. According to this combination in the present invention, the bandwidth is narrowed, while the sensitivity is increased in comparison with a photo-detector comprising the conventional $SrF_2$ monocrystal window. The present invention is featured in that the sensitivity and the bandwidth property are simultaneously improved by simply changing the conventional monocrystal window of the conventional band pass filter type photo-detector to the $CaF_2$ monocrystal window deposited with a KCl thin film 150 Å thick.

What is claimed is:

1. For use in inverse photo emission spectroscopy wherein an electron gun directs an electron beam on to a sample, a narrow band high sensitivity photo-electron detector adapted to receive light emitted by said sample when said electron beam impinges thereon, said photo-electron detector comprising:

a photo-electron multiplier including a dynode having a KCl film deposited thereon, said photo-electron multiplier further having a collector for collecting electrons emitted by said dynode;

a $CaF_2$ monocrystal window interposed between the sample and said dynode, said $CaF_2$ window having a KCl film deposited thereon, light emitted by the sample being transmitted through said $CaF_2$ window to impinge on said dynode; and output means coupled to an output of said photo-electron multiplier for measuring the intensity of the electrons collected by said collector.

2. A photo-electron detector as defined by claim 1 wherein the dynode of said photo-electron multiplier having a KCl film deposited thereon functions as a high pass filter and said $CaF_2$ monocrystal window having a KCl film deposited thereon functions as a low pass filter, said combination functioning as a bandpass filter.

3. A photo-detector as defined by claim 1 wherein said output means comprises a pulse counter circuit coupled to said photo-electron multiplier by an amplifier.

\* \* \* \* \*